(12) United States Patent
Chen et al.

(10) Patent No.: US 9,891,372 B2
(45) Date of Patent: Feb. 13, 2018

(54) BACKLIGHT MODULE AND LIQUID CRYSTAL DISPLAY DEVICE USING SAME

(71) Applicant: HON HAI PRECISION INDUSTRY CO., LTD., New Taipei (TW)

(72) Inventors: Chih-Hsien Chen, New Taipei (TW); Cheng-Fa Chung, New Taipei (TW); Yue-Han Chen, New Taipei (TW); I-Ting Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/298,322

(22) Filed: Oct. 20, 2016

(65) Prior Publication Data
US 2017/0343726 A1 Nov. 30, 2017

(30) Foreign Application Priority Data
May 25, 2016 (CN) .......................... 2016 1 0354160

(51) Int. Cl.
*F21V 8/00* (2006.01)

(52) U.S. Cl.
CPC ......... *G02B 6/0081* (2013.01); *G02B 6/0083* (2013.01)

(58) Field of Classification Search
CPC ............. G02F 1/1335; G02F 1/133524; G02F 1/133308; G02F 1/133615; G02F 1/133603; G02F 1/133608; G02F 1/1336; G02F 1/1333; G02F 1/133305; G02F 1/133385; G02F 1/133382; G02F 2001/133628; G02F 2001/133314; G02F 2001/133317; G02F 2001/13332; G02B 6/0085; G02B 6/0088; G02B 6/0068; G02B 6/0073; G02B 6/0091; G02B 6/009; G02B 6/0038; G02B 6/0021; G02B 6/0011; G02B 6/0045; G02B 6/00; G02B 6/0001; G02B 6/0028; G02B 6/0093; H05K 2201/10106; H05K 2201/066; H05K 2201/10128; H05K 2201/10553; H05K 1/0203; H05K 1/0209; H05K 1/028; H05K 3/0061; H05K 7/20963; C09J 121/00; C09J 2201/606; C09J 7/0246; F21K 9/238
USPC ...... 349/65, 61, 58, 150, 161, 122; 362/611, 362/608, 612, 621, 633, 97.3, 600, 631, 362/97.1, 97.2; 257/99
See application file for complete search history.

(56) References Cited

U.S. PATENT DOCUMENTS

| | | | |
|---|---|---|---|
| 2015/0146110 A1* | 5/2015 | Matsukawa | H04N 5/64 348/790 |
| 2015/0192729 A1* | 7/2015 | Hosoki | G02F 1/133308 348/794 |

\* cited by examiner

*Primary Examiner* — Thoi Duong
(74) *Attorney, Agent, or Firm* — ScienBiziP, P.C.

(57) ABSTRACT

A backlight module includes a light guiding plate having a side surface, at least one light source facing towards the light guiding plate, and a thermal insulation element. The thermal insulation element is configured to prevent heat from the at least one light source from transferring to the bezel and display panel. The thermal insulation element is coupled to the side surface. The at least one light source is enclosed by the light guiding plate and the thermal insulation element.

18 Claims, 6 Drawing Sheets

100

BACKLIGHT MODULE AND LIQUID CRYSTAL DISPLAY DEVICE USING SAME

FIELD

The subject matter herein generally relates to a backlight module and a liquid crystal display (LCD) device using the backlight module.

BACKGROUND

The related art as shown in FIG. 1, comprises an LCD device 300 having a display panel 301, a bezel 303, and a backlight module 305. The bezel 303 defines a receiving space 3031, and an end portion of the backlight module 305 is received in the receiving space 3031. The backlight module 305 includes a light guiding plate 3051, a circuit board 3055, and at least one light source 3053 mounted on the circuit board 3055. The circuit board 3055 is coupled to a side of the light guiding plate 3051, and the at least one light source 3053 is located between the circuit board 3055 and the light guiding plate 3051. In this LCD device 300, the display panel 301 as well as the light source 3053 are prone to damage and failure as heat from the light source 3053 transfers to the bezel 303 and the display panel 301, leading to device malfunction, damage, and ultimately device failure. Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
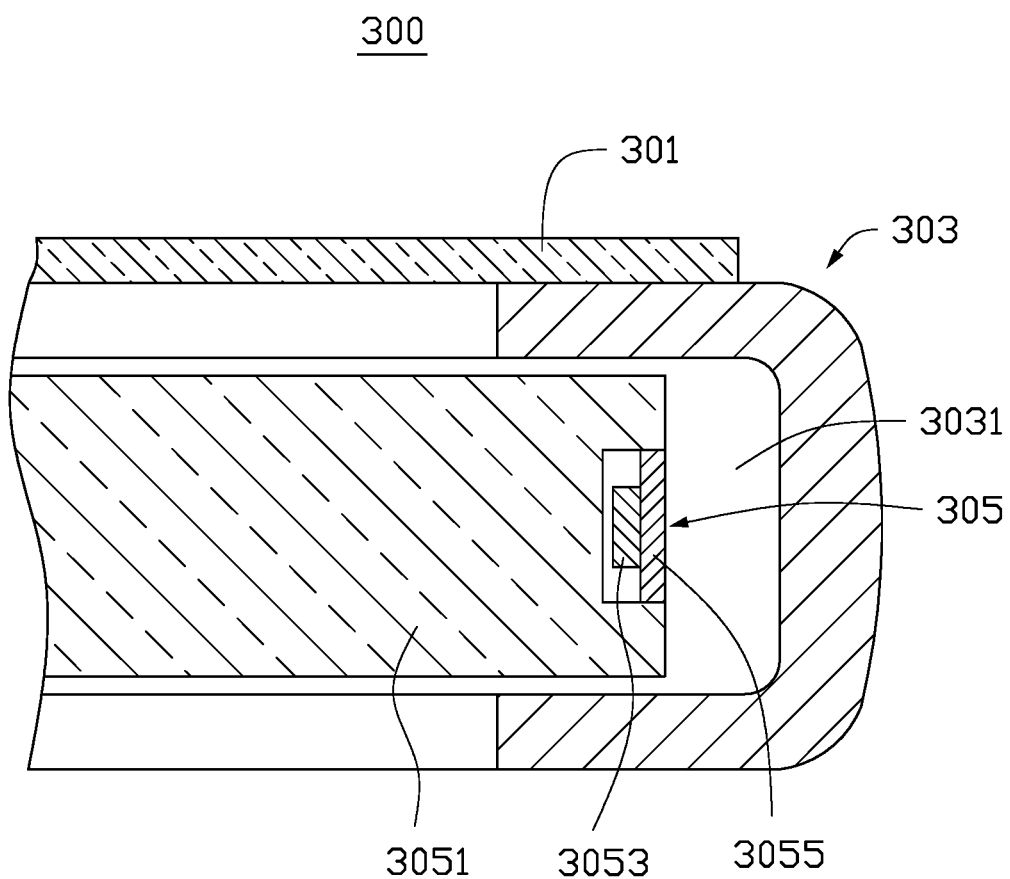
FIG. 1 is a cross-sectional view of an LCD device of related art.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
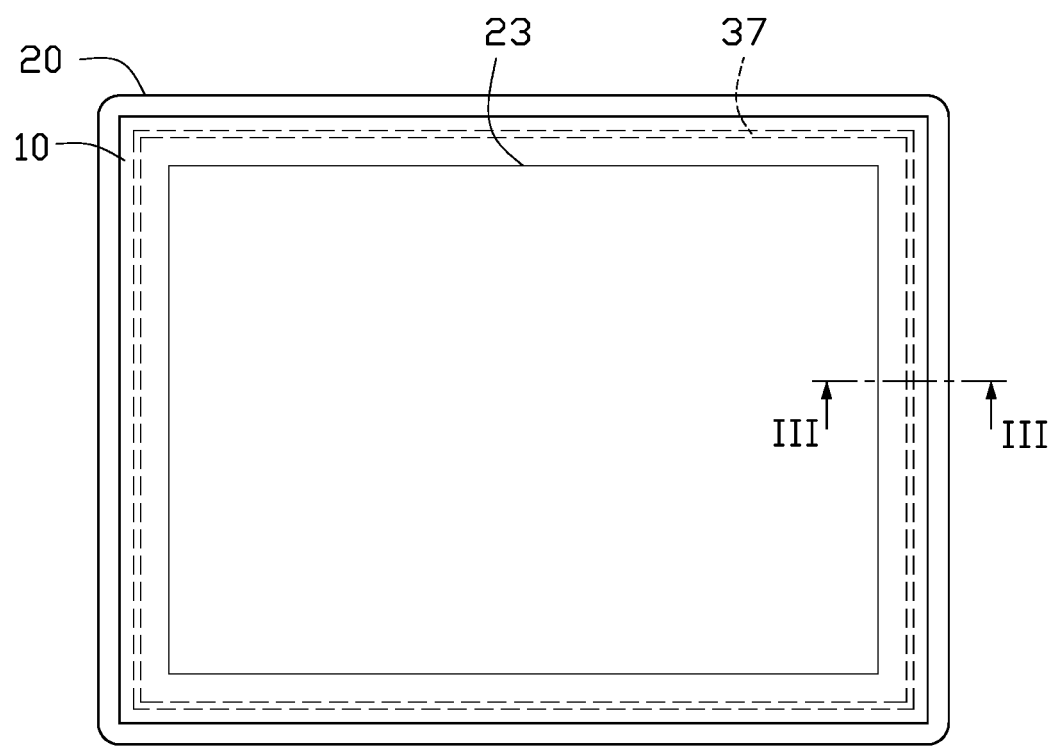
FIG. 2 is a planar view of a first exemplary embodiment of a heat-protected LCD device.
Figure 3:
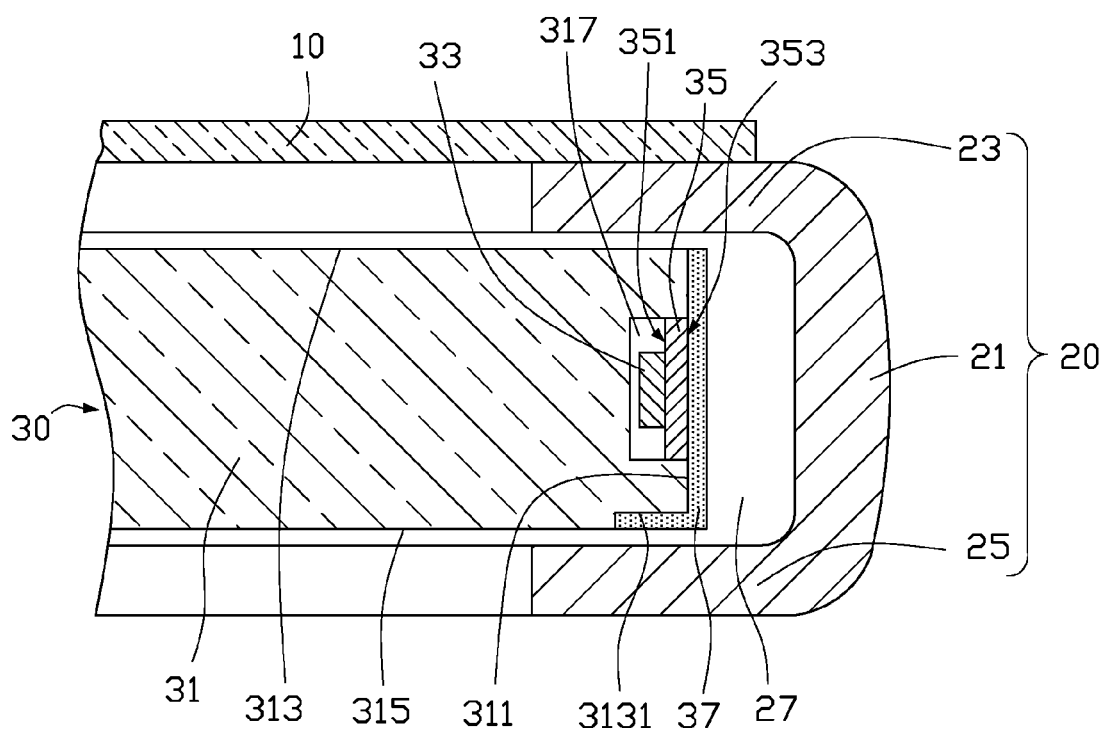
FIG. 3 is a cross-sectional view of the LCD device of FIG. 2 along line III-III.

FIG. 2 and FIG. 3 illustrate an LCD device 100 according to a first exemplary embodiment. The LCD device 100 includes a display panel 10, a backlight module 30 positioned under the display panel 10, and a bezel 20 wraps around the backlight module 30. The ends of the backlight module 30 extend to be received in the bezel 20. In this embodiment, the display panel 10 has a rectangular shape, and the bezel 20 has a rectangular frame shape.

As shown in FIG. 3, the bezel 20 includes a first portion 23, a second portion 25 opposite to the first portion 23, and a middle portion 21 coupled between the first portion 23 and the second portion 25. In this embodiment, the first portion 23 is parallel to the second portion 25. The display panel 10 is located on the first portion 23. The middle portion 21, the first portion 23, and the second portion 25 cooperatively form a receiving space 27 to receive the end portions of the backlight module 30.

The backlight module 30 includes a light guiding plate 31, a circuit board 35, at least one light source 33 mounted on the circuit board 35, and a thermal insulating element 37. The light guiding plate 31 includes a top surface 313 adjacent to the display panel 10, a bottom surface 315 facing away from the display panel 10, and a side surface 311 coupled between the top surface 313 and the bottom surface 315. The side surface 311 faces towards the middle portion 21 of the bezel 20. The end portions of the light guiding plate 31, the circuit board 35, the at least one light source 33, and the thermal insulating element 37 are received in the receiving space 27.

A groove 317 is defined in the side surface 311. The circuit board 35 and at least one light source 33 are received in the groove 317.

The circuit board 35 includes a first surface 351 and a second surface 353, the second surface 353 is opposite to the first surface 351. The second surface 353 is at least substantially adjacent to the middle portion 21 of the bezel 20, and the first surface 351 faces away from the middle portion 21 of the bezel 20. The second surface 353 is flush with the side surface 311. That is, the second surface 353 and the side surface 311 are at least substantially coplanar. The at least one light source 33 is mounted on the first surface 351. The at least one light source 33 emits light to the light guiding plate 31. In this exemplary embodiment, the at least one light source 33 may be an LED lamp. The circuit board 35 may be a metal core printed circuit board.

The thermal insulating element 37 is coupled to the side surface 311 of the light guiding plate 31 and covers the groove 317. The thermal insulating element 37 directly contacts the circuit board 35, but it spaced apart from the middle portion 21 of the bezel 20. The thermal insulating element 37 prevents heat from the light source 33 from being dissipated to the bezel 20.

Figure 4:
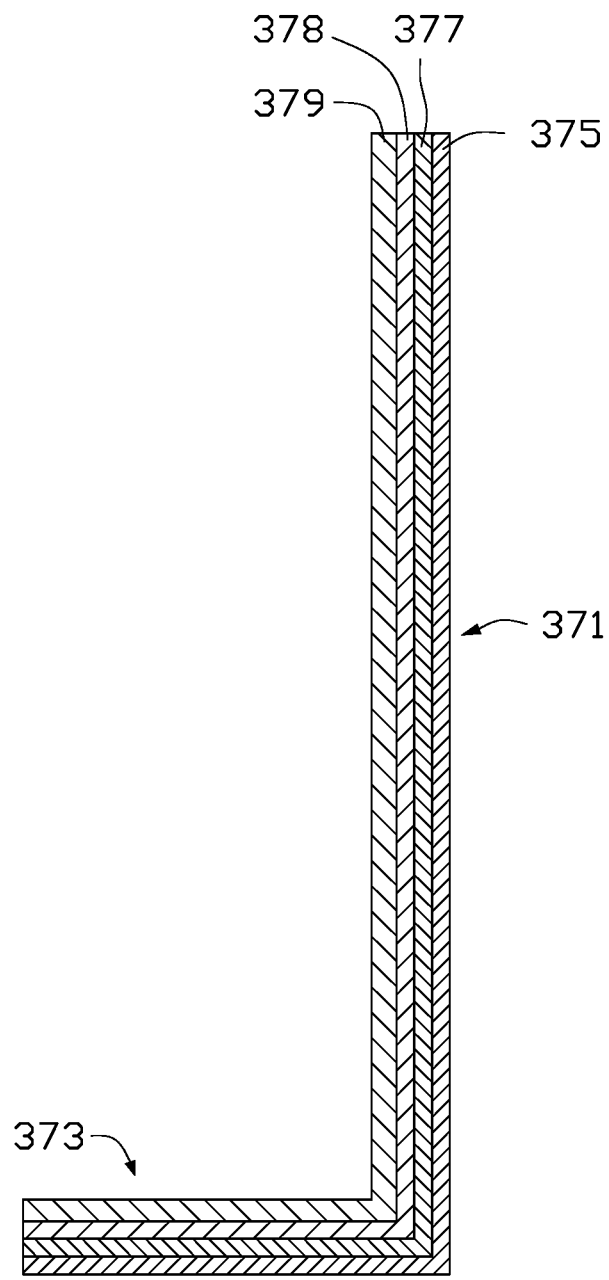
FIG. 4 is an isometric view of an exemplary embodiment of the thermal insulating element in the LCD device of FIG. 3.

The thermal insulating element 37 can be a common thermal insulating element. Such an element may have a single-layer structure, a double-layer structure, or a multi-layered structure. For example, as shown in FIG. 4, the thermal insulating element 37 has a multi-layered structure and includes a thermal insulation material layer 375. A metal reflecting layer 377 is positioned on the thermal insulation material layer 375. An organic pigmented layer 378 is positioned on the metal reflecting layer 377, and an adhesive layer 379 is positioned on the organic pigmented layer 378. The adhesive layer 379 directly contacts the side surface 311 of the light guiding plate 31. The thermal insulation material layer 375 may be made of polyethylene terephthalate.

In this exemplary embodiment, the thermal insulating element 37 is not only coupled to the side surface 311 of the light guiding plate 31, but also extends to be coupled to the bottom surface 315 of the light guiding plate 31. That is, the thermal insulating element 37 has an "L" shape and includes a first attaching portion 371 and a second attaching portion 373; the second attaching portion 373 extends from the first attaching portion 371. In this exemplary embodiment, the second attaching portion 373 is perpendicular to the first attaching portion 371. The first attaching portion 371 directly contacts both the side surface 311 of the light guiding plate 31 and the second surface 353 of the circuit board 35.

In this exemplary embodiment, an indentation 3131 is defined in the bottom surface 315 of the light guiding plate 31 adjacent to the side surface 311. The second attaching portion 373 is received in the indentation 3131. The second attaching portion 373 is flush with the bottom surface 315 of the light guiding plate 31.

Figure 5:
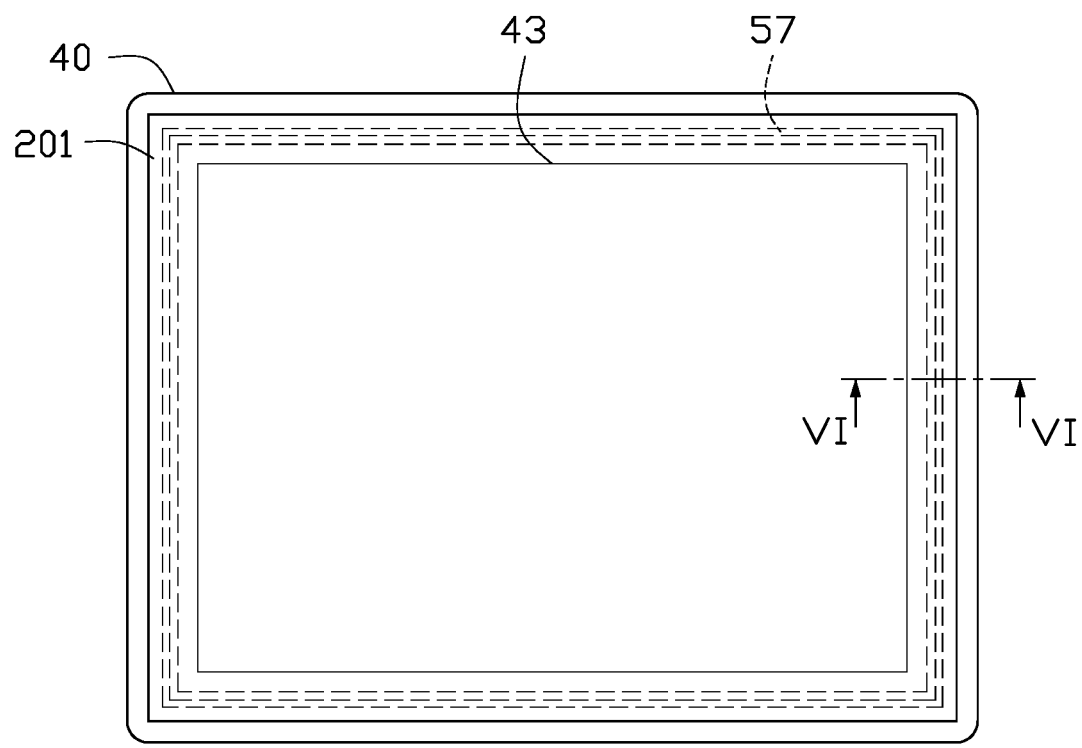
FIG. 5 is a planar view of a second exemplary embodiment of a heat-protected LCD device.
Figure 6:
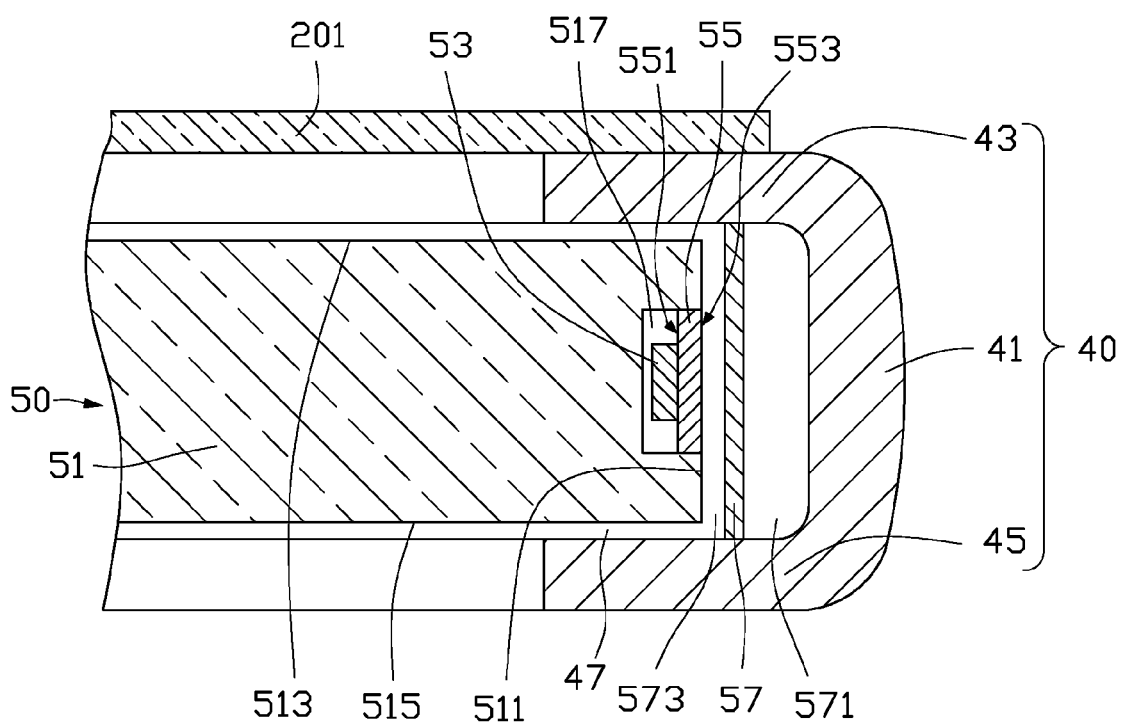
FIG. 6 is a cross-sectional view of the LCD device of FIG. 5 along line VI-VI.

FIG. 5 and FIG. 6 illustrate an LCD device 200 according to a second exemplary embodiment. The LCD device 200 includes a display panel 201, a backlight module 50 positioned under the display panel 201, and a bezel 40 wrapping around the backlight module 50. The ends of the backlight module 50 extend to be received in the bezel 40.

As shown in FIG. 6, the bezel 40 includes a first portion 43, a second portion 45 opposite to the first portion 43, and a middle portion 41 coupled between the first portion 43 and the second portion 45. In this exemplary embodiment, the first portion 43 is parallel to the second portion 45. The display panel 201 is located on the first portion 43. The middle portion 41, the first portion 43, and the second portion 45 cooperatively form a receiving space 47. The receiving space 47 receives the end portions of the backlight module 50.

The backlight module 50 includes a light guiding plate 51, a circuit board 55, and at least one light source 53 mounted on the circuit board 55. The light guiding plate 51 includes a top surface 513 adjacent to the display panel 201, a bottom surface 515 facing away from the display panel 201, and a side surface 511 coupled between the top surface 513 and the bottom surface 515. The side surface 511 faces towards the middle portion 41 of the bezel 40 and is spaced apart from the middle portion 41. End portions of the light guiding plate 51, the circuit board 55, and the at least one light source 53 are received in the receiving space 47.

A groove 517 is defined in the side surface 511. The circuit board 55 and at least one light source 53 are received in the groove 517.

The circuit board 55 includes a first surface 551 and a second surface 553, the second surface 553 opposite to the first surface 551. The second surface 553 is adjacent to the middle portion 41 of the bezel 40, and the first surface 551 faces away from the middle portion 41 of the bezel 40. The second surface 553 is flush with the side surface 511. That is, the second surface 553 and the side surface 511 are substantially coplanar. The at least one light source 53 is mounted on the first surface 551. The at least one light source 53 is emits light to the light guiding plate 51. In this exemplary embodiment, the at least one light source 53 may be an LED lamp, the circuit board 55 may be a metal core printed circuit board.

The LCD device 200 further includes a thermal insulating element 57. The thermal insulating element 57 is received in the receiving space 47 and positioned between the side surface 511 of the light guiding plate 51 and the middle portion 41 of the bezel 40. The thermal insulating element 57 is spaced apart from the middle portion 41 of the bezel 40. In this exemplary embodiment, the thermal insulating element 57 is also spaced apart from the side surface 511 of the light guiding plate 51. In other exemplary embodiments, the thermal insulating element 57 may directly contact the side surface 511 of the light guiding plate 51.

In this exemplary embodiment, the thermal insulating element 57 is flat. The thermal insulating element 57 is coupled between the first portion 43 and the second portion 45, thereby the receiving space 47 is divided into two spaces by the thermal insulating element 57. The two spaces of the receiving space 47 are a sealed space 571 and an unsealed space 573. The sealed space 571 is totally enclosed by the thermal insulating element 57, the middle portion 41, the first portion 43, and the second portion 45. The sealed space 571 is a vacuum space. A portion of the light guiding plate 51, the circuit board 55, and at least one light source 53 are received in the unsealed space 573.

The thermal insulating element 57 can be a common thermal insulating element with a single-layer structure, a double-layer structure, or a multi-layered structure. The thermal insulating element 57 may be made of a common thermal insulation material.

The thermal insulating element 57 and the sealed space 571 prevent heat from the light source 53 from moving to the bezel 40.

The embodiments shown and described above are only examples. Many details are often found in the art such as other features of a display device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A backlight module comprising:
   a light guiding plate comprising a side surface;
   at least one light source facing towards the light guiding plate; and
   a thermal insulation element configured to thermally insulate the at least one light source;
   wherein the thermal insulation element is coupled to the side surface; and the at least one light source is enclosed by the light guiding plate and the thermal insulation element.

2. The backlight module of claim 1, wherein a groove is defined in the side surface; and the at least one light source is received in the groove.

3. The backlight module of claim 2, wherein the backlight module further comprises a circuit board received in the groove; wherein the at least one light source is mounted on the circuit board.

4. The backlight module of claim 3, wherein the circuit board includes a first surface and a second surface opposite to the first surface; wherein the at least one light source is mounted on the first surface; and wherein the second surface and the side surface are coplanar.

5. The backlight module of claim 3, wherein the thermal insulation element directly contacts the circuit board.

6. The backlight module of claim 1, wherein the light guiding plate further comprises a bottom surface connecting the side surface; and wherein the thermal insulation element comprises a first attaching portion coupled to the side surface and a second attaching portion coupled to the bottom surface.

7. The backlight module of claim 6, wherein an indentation is defined in the bottom surface; and the second attaching portion is received in the indentation.

8. The backlight module of claim 6, wherein the second attaching portion is flush with the bottom surface.

9. A LCD device comprising:
a display panel; and
a backlight module positioned under the display panel, the backlight module comprising:
a light guiding plate comprising a side surface;
at least one light source facing towards the light guiding plate; and
a thermal insulation element configured to thermally insulate heat from the at least one light source;
wherein the thermal insulation element is coupled to the side surface; and the at least one light source is enclosed by the light guiding plate and the thermal insulation element.

10. The LCD device of claim 9, wherein a groove is defined in the side surface; and the at least one light source is received in the groove.

11. The LCD device of claim 10, wherein the backlight module further comprises a circuit board received in the groove; wherein the at least one light source is mounted on the circuit board.

12. The LCD device of claim 11, wherein the circuit board includes a first surface and a second surface opposite to the first surface; wherein the at least one light source is mounted on the first surface; and wherein the second surface and the side surface are coplanar.

13. The LCD device of claim 12, wherein the thermal insulation element directly contacts the circuit board.

14. The LCD device of claim 9, wherein the light guiding plate further comprises a bottom surface connecting the side surface; and wherein the thermal insulation element comprises a first attaching portion coupled to the side surface and a second attaching portion coupled to the bottom surface.

15. The LCD device of claim 14, wherein an indentation is defined in the bottom surface; the second attaching portion is received in the indentation.

16. The LCD device of claim 15, wherein the second attaching portion flushes the bottom surface.

17. The LCD device of claim 9, further comprising a bezel wrapped around the backlight module, wherein the bezel comprises a first portion, a second portion opposite to the first portion, and a middle portion coupled between the first portion and the second portion; wherein the display panel is located on the first portion; and the middle portion, the first portion, and the second portion together form a receiving space to receive an end portion of the backlight module.

18. The LCD device of claim 17, wherein an end portion of the light guiding plate, the at least one light source, and the thermal insulation element are received in the receiving space.

* * * * *